(12) United States Patent
Duquenne et al.

(10) Patent No.: US 6,336,844 B1
(45) Date of Patent: Jan. 8, 2002

(54) METHOD AND MACHINE FOR THE ULTRASONIC PEENING OF PARTS ON A WHEEL

(75) Inventors: Catherine Dominique Béatrice Duquenne, Hericy; Véronique Christiane Raymonde Giffard, St Vrain; Gérard Michel Roland Gueldry, Vert St Denis; Claude Marcel Mons, Savigny le Temple, all of (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 09/714,194

(22) Filed: Nov. 17, 2000

(30) Foreign Application Priority Data

Nov. 18, 1999 (FR) .............................. 99 14482

(51) Int. Cl.$^7$ ................................ B24B 1/00
(52) U.S. Cl. .................. 451/36; 451/165; 451/910; 451/106; 451/113
(58) Field of Search ................... 457/32, 38, 39, 457/82, 87, 88, 89, 98, 326, 165, 36, 35, 104, 106, 113, 910

(56) References Cited

U.S. PATENT DOCUMENTS

| 2,494,733 A | * | 1/1950 | Whitehead |
| 2,796,702 A | * | 6/1957 | Bodine, Jr. |
| 3,464,163 A | * | 9/1969 | Ferrara |
| 4,122,603 A | * | 10/1978 | Sastri .................. 451/165 |

FOREIGN PATENT DOCUMENTS

| FR | 2 689 431 | 10/1993 |
| FR | 2 714 629 | 7/1995 |
| FR | 2 753 406 | 3/1998 |

* cited by examiner

*Primary Examiner*—Eileen P. Morgan
(74) *Attorney, Agent, or Firm*—Oblon, Spivak, McClelland, Maier & Neustadt, P.C.

(57) ABSTRACT

The invention relates to a method and machine for so-called "ultrasonic" peening employing a mist of microbeads inside an active chamber 30c for peening parts 21 on a wheel 19, ie blades on a rotator. The periphery of the wheel 19 is brought simultaneously past the openings of at least three chambers with limited clearances E1 and E2. At least one chamber being active with a peening mist of microbeads and at least two chambers, either side of the active chamber, being passive. The wheel being rotated over the chambers and the microbeads are removed from the passive chambers and in that the active chambers are supplied with microbeads therefrom.

11 Claims, 4 Drawing Sheets

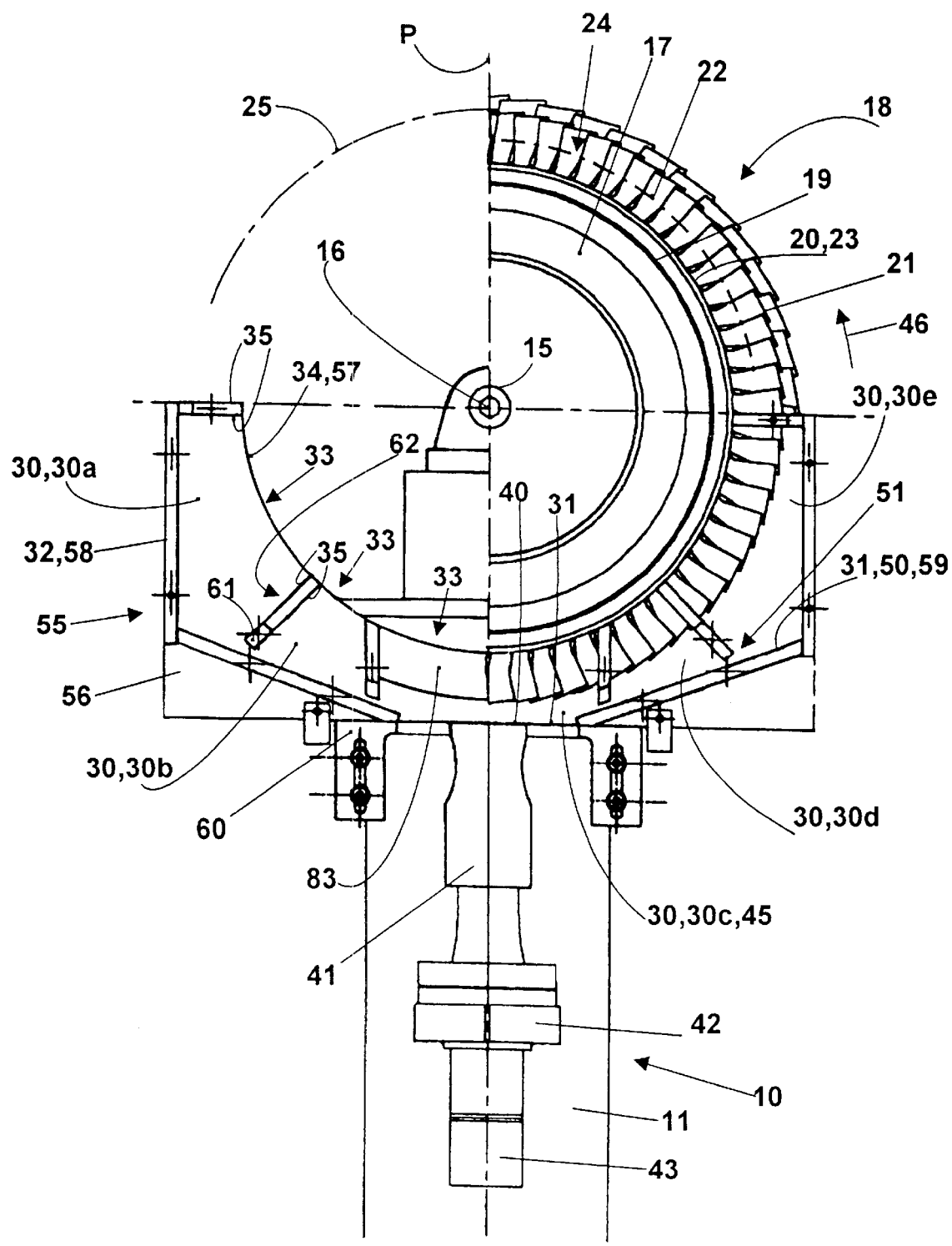
Fig : 1

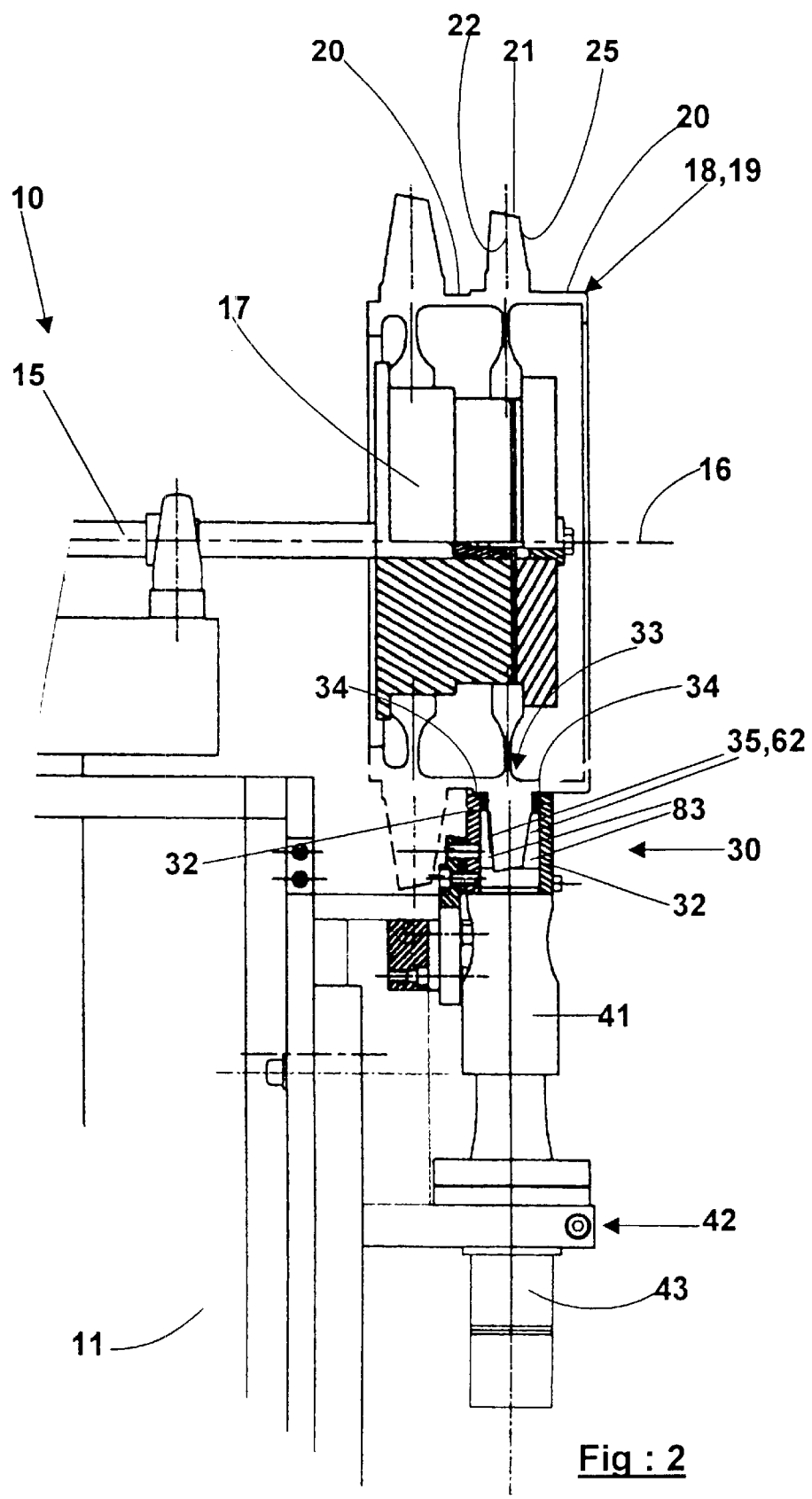
Fig : 2

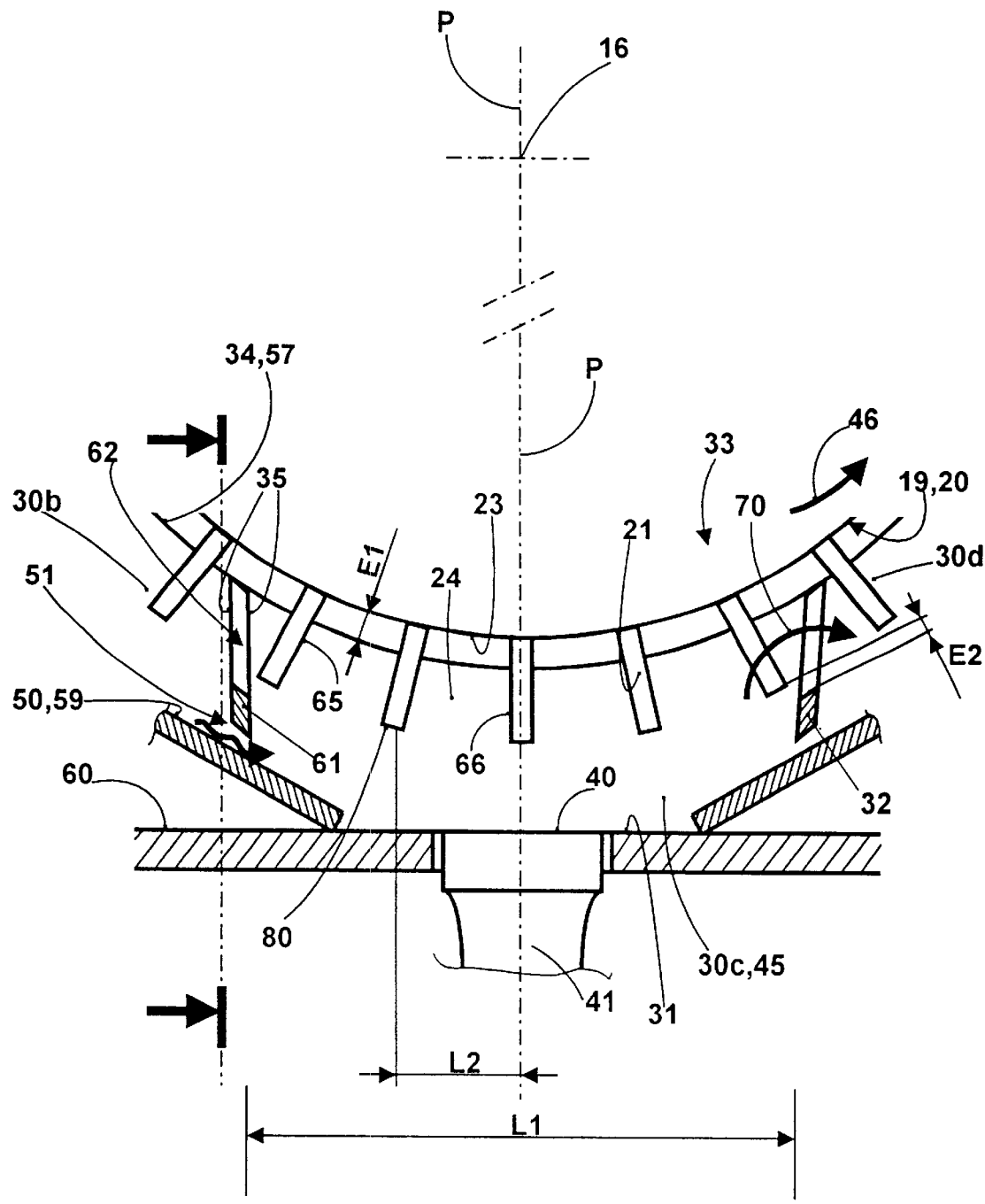
Fig : 3

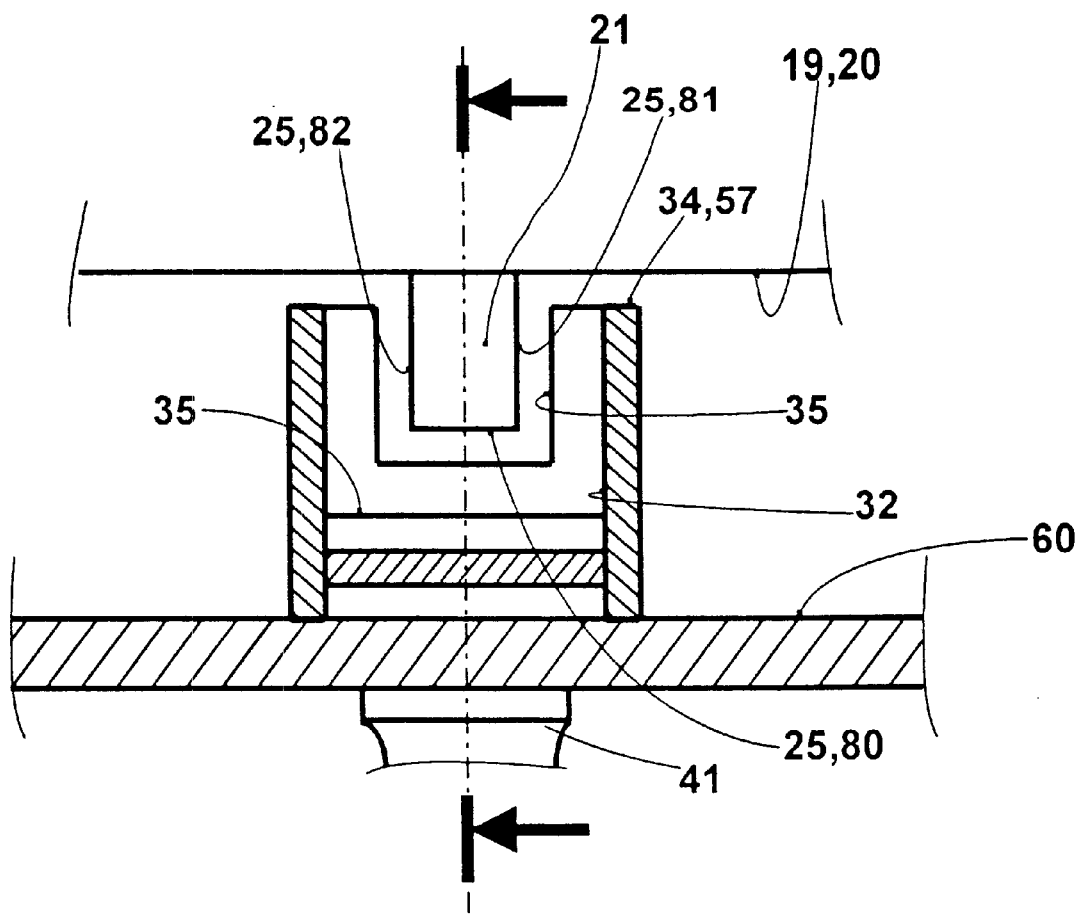
Fig : 4

METHOD AND MACHINE FOR THE ULTRASONIC PEENING OF PARTS ON A WHEEL

BACKGROUND OF THE INVENTION

1. Field of the Invention

The invention relates to a method of so-called "ultrasonic" peening employing a mist of microbeads inside a chamber and, more particularly, relates to a method for peening parts on a wheel, such as the aerofoils of turbo machine blades on a rotor. The invention also relates to a peening machine essential in implementing the present method.

2. Summary of the Prior Art

The term "wheel" is to be understood as meaning an object with an overall shape that is axis symmetric about a geometric axis, it being possible for this object to be rotated about this axis.

To improve the fatigue strength of mechanical parts, it is known practice for their surface to be peened by blasting with microbeads. This technique is widely used in aeronautics. Peening involves impacting the surface of the part at a low angle of incidence with respect to the perpendicular to this surface. Thus, with sufficient kinetic energy, the microbeads cause permanent surface compression over a shallow depth. This surfaces compression inhibits the initiation and propagation of cracks on the surface of the part, which improves its fatigue strength. Typically, this angle of incidence has to be smaller than 30° for the impacts to be able to transmit sufficient energy from the bead to the impacted surface. The exposure of the part to peening passes through an optimum level which gives this part the best strength. Insufficient peening does not give the anticipated strength, but it is still possible to achieve the optimum by performing additional peening. By contrast, excessive peening causes surface damage to the part with a drop in its strength. This damage cannot be recovered and the part has to be scrapped.

Peening is customarily performed using nozzles supplied both with compressed gas and with microbeads. The compressed gas propels the microbeads towards the parts. This method of peening has two disadvantages per se:

the peening parameters are unstable and the peening machine has to be checked and adjusted frequently in order to achieve peening that is close to the optimum level, the peening method has to be performed inside a booth which is large enough to allow the parts and the peening nozzles to be handled.

It is known practice in the aerospace industry for the flanks of the blades of aircraft turbine engine rotors to be peened. When the blades are manufactured separately, they each comprise a thin aerofoil and a root for holding the blade. To peen the thin aerofoil, the blade is held by the root and peening is performed with two nozzles pointing towards one another on each side of the acrofoil. One of the nozzles peens one Hank of the acrofoil and the other nozzle peens the other flank of the acrofoil. The two nozzles sweep across the flanks of the aerofoils and are moved with the best possible synchronisation so that peening progresses symmetrically.

When this symmetry is not achieved, stress peaks appear under the most peened flank. These stress peaks reduce the ability of the blade to withstand the loadings and lead to blade deformation. Peening symmetry is tricky to achieve and to maintain because of the spread and drift in the peening parameters inherent to this nozzle peening method. It will be understood that close to optimum blade peening is a lengthy and expensive operation because it has to be performed blade by blade with great precision.

Attempts have also been made at peening the blades of bladed wheels directly in the manner described above. These wheel and blade assemblies are made as a single piece, the acrofoils of the blades projecting from the wheel. Peening has to be achieved on the flanks of the aerofoils and the surfaces of the wheel known as the "tinter-blade space", ie the surfaces located between two side-by-side aerofoils and possibly around these aerofoils. The blades can be mounted on the wheel or alternatively the aerofoils may be integral with the wheel.

Peening on bladed wheels is performed blade by blade as follows:

the two flanks of each blade are peened in synchronism using two deflected-jet nozzles entering the inter-blade spaces, that is to say the spaces located between two side-by-side aerofoils, said nozzles each comprising a reflector for deflecting the stream of microbeads through 90° and directing it normally onto the flanks of the blades.

then using a direct-jet nozzle to peen the inter-blade surface of the wheel.

One disadvantage with the above is the inevitable overlap of the peening of the flanks of the aerofoils and the peening of the inter-blade surface in the transition zone between said flanks and said inter-blade surface. It will therefore be understood that this transition zone is peened twice.

One major disadvantage of the above is that it is impossible to use the method when the inter-blade space is too narrow for the peening nozzles to gain access, which is often the case with present-day bladed wheels.

International patent application WO 95/17994, particularly designating the United States of America, discloses an ultrasonic peening machine employing a titanium bowl. The bottom of this titanium bowl is vibrated by a sonotrode associated with a magnetostriction vibrator. The parts that are to be peened are suspended from a lid placed over the opening of the bowl. The entire bowl is vibrated and, along with the lid. constitutes a peening chamber inside which a mist of microbeads is thus sustained. This peening chamber does not allow the peening of thin parts, such as the aerofoils of bladed wheels, as the mist of microbeads is heterogeneous, not least because the distribution of vibrational energy is highly complex and has antinodes and nodes. In addition, a very large titanium bowl is needed to form a peening chamber capable of peening a complete bladed wheel. Such a bowl is very expensive and requires a powerful vibration generator.

In French patent 2 689 431, a method for peening the teeth of a pinion is disclosed. The pinion is rotated past a sonotrode, the teeth of the pinion passing the sonotrode in turn. The sonotrode is surrounded by a curtain of spring-loaded rods, which come into contact with the teeth and with the pinion to form a sealed chamber around the sonotrode. The deformable edges of the chamber follow the profile of the teeth and of the pinion. The method of FR 2 689 431 cannot be applied to a bladed wheel because:

the peening of the flanks of the aerofoils would be highly asymmetric, the rods would not automatically be able to follow the flanks of the aerofoils which are too closely spaced and close to the radial position.

In addition, optimum peening is difficult to achieve because peening would have to be halted precisely in order to treat the entire periphery of the wheel without subjecting that part of the wheel which was exposed to the peening first to any additional peening.

A first problem to be solved is that of peening the flanks of the aerofoils of a bladed wheel when said flanks are too close together for peening nozzles to gain access.

A second problem is that of peening the flanks of the aerotbils and the inter-blade surfaces of the wheel without peening the transition zones between said flanks and said inter-blade surfaces twice.

A third problem is that of speeding up the peening of the aerofoils and of the inter-blade surfaces of a bladed wheel.

A fourth problem is that of improving the symmetry of the peening on the opposite flanks of the aerofoils.

SUMMARY OF The INVENTION

The invention proposes a method for ultrasonic peening of parts on a wheel comprising an annular surface centered on the geometric axis of rotation of the wheel, the method including the steps of:

a) providing the parts on said annular surface of the wheel aligned on a geometric circle centered on the geometric axis of rotation so that the parts of the wheel define a geometric surface of revolution, b) providing at least three chambers with respective openings having lateral edges, c) providing said wheel simultaneously above the openings of said at least three chambers so that at least some of the said parts extend into said chambers through said openings and said lateral edges are arranged on each side of said parts on said wheel.

d) providing said lateral edges with a limited clearance E1 from said annular surface e) providing said openings with two shaped edges facing one another so that said shaped edges face the geometric surface of rotation with limited clearance E2, f) providing each chamber adjacent its neighbouring chamber with a shaped edge between these chambers, g) providing at least one chamber with a vibration surface so that said chamber is an active chamber whilst at least two other chambers are passive chambers, h) providing each active chamber between two other chambers either side, i) providing at least one active chamber with a plurality of microbeads whereby said vibration surface energises said plurality of microbeads to form a mist of microbeads in the said active chamber, j) rotating said wheel about its geometric axis of rotation in order that said parts on said wheel pass successively through said chambers whereby said mist of microbeads provides peening of said parts on said wheel, k) supplying microbeads to said at least one active chamber and recovering any of said microbeads which are carried into and fall in any of said passive chambers.

It will be understood that the parts may be removable on the wheel or alternatively may be incorporated into the wheel through continuity of the material from which they are made. Whichever the case may be, the parts each pass in turn into each chamber under the effect of the rotation of the wheel, which allows all of them to be peened. It will be readily understood that an active chamber never opens via a shaped edge directly to the outside but always opens via at least one passive chamber, only a passive chamber being able to open to the outside via a shaped edge. It will be understood that there is only a limited clearance between the lateral edges and the shaped edges and so these edges collaborate to seal the chamber against microbeads with respect to the wheel and to the parts, said sealing being a contactless seal. In effect, the lateral edges close the chambers on the annular surface of the wheel, said annular surface thus progressing along the lateral edges with a clearance E1, and said parts progressing between the lateral edges when the wheel rotates about its geometric axis of rotation. Likewise, the shaped edges close the chambers on the envelope surface, the parts passing transversely past the shaped edges with a limited clearance E2. This seal needs to be sufficient for the mist of the microbeads to remain concentrated in a small volume so that the energy behind it is not dispersed excessively.

It will be understood that microbeads gradually escape from an active chamber by passing through the spaces between parts, that is to say between two parts, when said spaces between parts pass a shaped edge. As an active chamber is adjacent, at each of its shaped edges, to another chamber, these microbeads arrive in the adjacent chambers. There are two scenarios: if this adjacent chamber is a passive chamber, the microbeads which have entered it no longer receive any energy from a vibrating surface and so quickly drop to the bottom of said passive chamber as the energy driving them is used up; if this adjacent chamber is an active chamber, microbeads will once again escape through the spaces between parts and will enter the two adjacent chambers, and so on, until they reach a passive chamber in which they will use up their energy and drop to the bottom. It will thus be understood that during peening, a stream of microbeads from the chambers to the passive chambers is created, this stream passing mainly through the spaces between parts, the microbeads accumulating in the passive chambers being recovered and advantageously reintroduced into the active chambers to supply these with microbeads.

It has been found that the mist of microbeads enters the narrow spaces between the aerofoils very well, right down to the inter-blade surface of the wheel, which makes it possible to completely peen the flanks of the aerofoils and solves the first problem of peening nozzle access. The inter-blade surfaces are peened at the same time as the flanks of the aerofoils. Thus, the transition zones between the flanks of the aerofoils and the inter-blade surfaces are peened only once which solves the second problem of repeat peening.

Typically, the conventional time taken to peen a set of 75 aerofoils in a booth is as much as 24 hours given the numerous intermediate handling operations required between each aerofoil. With the present method, this time is brought down to 90 minutes by eliminating these intermediate operations which solves the third problem of productivity.

In practice, the clearance E1 between the lateral edges and the annular surface is less than the diameter of the microbeads, which completely prevent the microbeads from passing through this clearance E1 and thus avoids the need to use additional means to recover microbeads which could otherwise have escaped through this clearance E1.

Advantageously, the clearance E2 between the shaped end and the envelope surface is at most equal to twice the diameter of the microbeads. This makes it possible to reduce the amount of microbeads passing from one chamber to another. This clearance E2 can also be given a value smaller than the diameter of the microbeads, which would completely prevent said microbeads from passing through this clearance E2 from one chamber to another, but this very small clearance E2 still obviously has no effect on microbeads passing through the spaces between parts from one chamber to another.

Advantageously, the circumferential width L1 of the chambers measured between the shaped edges is at least equal to three times the circumferential distance L2 between two consecutive parts, L1 and L2 being arc lengths along the two metric circles formed by the parts. In other words, a chamber may contain up to four parts simultaneously. In the ease of the active chambers, an arrangement such as this makes it possible for a mass of mist of microbeads to be sustained in this chamber, which mass is greater than the mass capable of escaping through a space between parts as it travels past a shaped edge, regulating said mass. In the case of the passive chambers, an arrangement such as this enlarges the chamber, encourages the microbeads to use up their energy and thus makes it possible to reduce the proportion of microbeads capable of escaping from the chamber. The effects produced are, however, improved when the ratio L1/L2 is larger, for example at least equal to five or ten.

Advantageously, the wheel makes at least N=5 revolutions during peening. With an arrangement such as this, each part receives, on each revolution of the wheel, just a fraction equal to 1/N of the total peening that is to be performed, which means that the parts can be peened in a uniform way close to the optimum. In fact it will be understood that the parts normally pass through an active chamber N times, but some of them will pass through the chamber N+1 or N−1 times depending on the way in which the least revolution is performed, this difference 1/N becoming negligible when N is large.

An arrangement such as this is particularly advantageous in the case of thin parts such as turbo machine blade aerofoils. Specifically, when a blade enters the vibrating chamber, its flank facing in the direction of rotation of the wheel comes to face the vibrating surface and its peening will take precedence over that of the opposite flank, whilst the converse occurs when this same aerofoil emerges from the active chamber an instant later. Thus, the way in which peening progresses on the opposite flanks of the blade is asymmetric as said aerofoil passes through the vibrating chamber, this asymmetry being absorbed when the acrofoil emerges from the vibrating chamber, this asymmetry therefore being divided by N and consequently becoming negligible, which solves the fourth problem defined above.

Advantageously, the active chambers and the vibrating surfaces are symmetric with respect to a vertical geometric plane P containing the geometric axis of rotation. With an arrangement such as this, the mist of microbeads obtained in the active chambers is symmetric with respect of this plane P, so that the rear and front flanks of the aerofoils in the mist of microbeads follow equivalent peening cycles, improving the overall symmetry of the peening performed on the flanks of the acrofoils.

The present invention also provides a peening machine including a spindle for holding and rotating a wheel about a geometric axis of rotation, the peening machine comprising a plurality of chambers including at least one active chamber having a vibrating surface for sustaining a mist of microbeads in said active chamber, the chambers each comprising an opening facing toward the geometric axis of rotation, each opening being delimited by two lateral edges facing each others one of the lateral edges of each opening being positioned on a first arc of a geometric circle centered on the geometric axis of rotation, while the other lateral edge of each opening is positioned on a second arc of a geometric circle, centered on the geometric axis or rotation, each opening also comprising two shaped edges which are identical and arranged on a geometric circle centered on the geometric axis of rotation, the said chambers each being adjacent to the next chamber with a shaped edge therebetween, each active chamber being located between two other chambers and means for supplying each said active chamber with microbeads and means for removing the microbeads from chambers other than each active chamber.

Advantageously, the means for supplying the active chambers with microbeads and the means for removing the microbeads from the passive chambers consist of thalwegs comprising high points and low points, said low points being in the active chambers and arriving at the vibrating surfaces, said high points being in the passive chambers. It will be understood that the thalwegs drain the microbeads which have dropped to the bottom of the passive chamber away under gravity to return them to the vibrating surfaces in the active chambers. These thalwegs pass through the lateral walls of the chambers by passing through tunnels.

Advantageously, the chambers are removable. Such chambers being of simple construction, for example made of plexiglas panels, this arrangement allows the peening machine to be adapted very simply to suit wheels and parts of different shapes and sizes.

BRIEF DESCRIPTION OF THE DRAWINGS

FIG. 1 illustrates, in view from the front, one embodiment of a peening machine according to the invention used for peening a bladed wheel rotor having two stages, and to provide greater distinction between the constituent parts of the rotor and those of the peening machine, only the right-hand half of the said rotor has been depicted.

FIG. 2 illustrates a side view, in partial section, of the peening machine and the rotor.

FIG. 3 illustrates, in an enlarged front view, the way in which the lateral faces of the blades are exposed to the mist of the microbeads inside the active chamber of the machine, the inter-blade spaces being shown enlarged for the sake of clarity.

FIG. 4 illustrates, in an enlarged side view, the active chamber and in particular shows how the blades pass through the cut-outs past the shaped edges.

DETAILED DESCRIPTION OF THE INVENTION

Reference is made to FIGS. 1 and 2 simultaneously. An ultrasonic peening machine 10 comprises a stand 11 supporting a spindle 15 rotating about a geometric axis of rotation 16. The spindle 15 at one end carries a chuck 17 capable of grasping a complete rotor 18. The spindle is driven by a motor, not depicted. The rotor 18 has an overall symmetric shape and is centered on the geometric axis 16. The rotor 18 comprises a circular wheel 19, the periphery of which is an annular surface 20 on which are arranged a number of aerofoils 21 which are aligned in a geometric circle centered on the geometric axis of rotation 16, so that the blades 21 pass, in succession, through the same positions under the effects of the wheel rotating. In this example, the rotor 18 comprises two stages of blades 21. The description which will follow applies equally to each of the stages. In this example also, the aerofoils 21 are arranged projecting radially from the annular surface 20 and are evenly spaced. An inter-blade surface consisting of the portion of annular surface 20 between the aerofoils 21 will be referenced 23. An inter-blade space, that is to say the space between the blades 21, will be referenced 24. When the wheel 19 turns, the blades 21 generate an envelope geometric surface 25 with a space which has symmetry of revolution about the geometric axis 16.

In this example, the peening machine 10 has five chambers 30. Each chamber 30 has an end 31 which constitutes its bottom most part, lateral walls 32 and an opening 33 facing upward and possibly to the side. Each opening 33 is delimited by two lateral edges referenced 34 in FIG. 3 which, with limited clearance E1, comes against the annular surface 20. These lateral edges 34 are therefore in the form of arcs of circles centered on the geometric axis 16. It can be seen from FIG. 2 that the aero foils 21 pass between the lateral edges 34 when the wheel 19 turns about the geometric axis 16. Each opening 33 is also delimited by two shaped edges 35 reflecting the shape of the blades 21. These blades 21 travel past said shaped edges 35 with limited clearance E2 when the wheel 19 rotates.

The chambers 30 form a sequence and are referenced 30a, 30b, 30c, 30d and 30e in succession. The chambers 30 are adjacent one to the next via the shaped edges 35. Thus, the chambers 30a and 30e at the ends of the sequence each have a shaped edge 35a and 35e respectively opening to the outside. All the other shaped edges 35 open to an adjacent chamber. It will thus be understood that when the wheel 19 rotates in the direction of rotation 46, each aerofoil entering from the outside enters the sequence of chambers 30 via the shaped edged 35a, passing in succession through the chambers 30a, 30b, 30c, 30d, 30e by passing between the lateral edges 34 and the shaped edges 35 before re-emerging on the outside via the shaped edge 35e.

The arrangements and functions of the various chambers 30 are not all identical. The chamber at the centre of the sequence 30c is active, and its horizontal bottom 31c surrounds a vibrating surface 40 at the end of a sonotrode 41 held on the stand 11 by an appropriate support 42 and receiving vibration energy from a vibration generator 43 of the quartz type. The sonotrode 41 transmits this vibrational energy to the vibrating surface 20 with a lowered impedance. The vibrating surface 40 transmits vibrating energy to microbeads on the surface 40 or striking it. These microbeads rebound in all directions against the lateral walls 32, the annular surface 20 and the aerofoils 21 present in the opening 33c of the active chamber 30c. These microbeads thus fill the volume of the active chamber 30c in the form of a mist of microbeads 45. The active chamber 30c is thus flanked on each side by two passive chambers namely 30b and 30a in succession on one side, and 30d and 30e in succession on the other side.

It will be understood that the lateral edges 34 and the shaped edges 35 seal the chambers 30 with respect to the wheel 19 and to the aerofoils 21. This seal varies however, in completeness. By giving the clearance E1 a value smaller than the diameter of the microbeads used, said microbeads are completely prevented from leaving the chambers by passing between the lateral edges 34 and the annular surface 30. By reducing the clearance E2 between the shaped edges 35 and the aerofoils 21 the flow rate of microbeads passing from the active chamber 30c to the two adjacent passive chambers 30b and 30d is reduced. However, there will still be a flow of microbeads passing through the inner-blade spaces 21 when said inter-blade spaces 21 move past a shaped edge 35.

The microbeads which have reached the passive chambers 30b and 30d no longer receive energy by impact with a vibrating surface. Thus, these microbeads soon use up the kinetic energy driving them by successive impacts against the lateral walls 32 and the bottom 33 of the passive chamber 30b and 30d and against the aerofoils 21 and the annular surfaces 20 which are present in said passive chambers 30b, 30d. These microbeads then drop under gravity to the bottom 31 of said passive chambers 30b, 30d. A small minority of microbeads still manages to pass into the passive chambers 30a, 30e at the end of the sequence. Their kinetic energy has, however, become very low and is then completely used up by the aforementioned successive rebounds. Thus, no microbeads are still able to re-emerge to the outside.

The operator tips an appropriate amount of microbeads into the active chamber 30c before beginning the peening of the wheel. This quantity of microbeads is sufficient to perform the entire peening operation and the operator therefore does not have to add any more during peening. In this example, the wheel 19 with the aerofoils 21 has a diameter of 900 mm, and the passive chambers stand up on each side over a height equal to half the diameter.

The microbeads present in the passive chambers 30a, 30b, 30d and 30e drop to the bottom 31 of said chambers as their kinetic energy is used up. These bottoms 31 are inclined and form two thalwegs 50 on each side of the active chamber 30c. These thalwegs 50 allow the microbeads to drop back under gravity to the bottom 31c of the active chamber 31 and reach the vibrating surface 40 where they will receive further energy and will renew the mist of microbeads 45 inside the active chamber 30c. The thalwegs 50 pass through the lateral wall 32 via tunnels 51 in order to allow the microbeads to pass from the passive chambers 30a, 30b, 30d, 30e to the active chamber 30c through the lateral walls 32.

In the described embodiment, the chambers 30 are removable and consist very simply of a tank 55 comprising two flat vertical mutually parallel longitudinal walls 56 perpendicular to the geometric axis of rotation 16. These longitudinal walls 56 each have a semicircular edge face 57 centered on said geometric axis of rotation 16. The edge faces come against the annular surface 20 of the wheel 19 on each side of the blades 21. The longitudinal walls 56 are connected by transverse walls 58 so as to close the tank 55 laterally. The transverse walls 58 converge on each other toward the bottom of the tank 55 to form a bottom 59 which is inclined toward the middle. The tank 55 is placed on a plate 60 attached to the stand 11. The plate surrounds the vibrating surface 40 at the upper end of the sonotrode 41. It will be understood that the tank 55 combined with the plate 60 and with the vibrating surface 40 is open at the top and scaled laterally and toward the bottom at least to movement of the microbeads. The tank 55 is divided into five chambers 30 by six transverse partitions 61 which are approximately radial with respect to the geometric axis of rotation 16. These transverse partitions 61 comprise unreferenced cutouts through which the blades 21 pass with the clearance E2 when the wheel 19 rotates. A tank 55 can be produced very simply by cutting its constituent parts from a sheet, for example of Pleixglas. These constituent parts are then assembled, for example using screws. It will be understood that the two edge faces 57 constituting the lateral edges 34 of the chambers 30 and that the edges of the cutouts in the transverse partitions 61 constitute the shaped edges 35. It will also be understood that the chamber 30 formed in the tank 55 above the vibrating surface 40 constitutes the active chamber 30c, where as the other chambers 30 formed in the tank 55 constitute the passive chambers 30a, 30b, 30d, 30e.

Reference will now be made to FIGS. 3 and 4 simultaneously. For reasons of clarity, the clearances E1 and E2 have been enlarged and the inter-blade spaces increased. The opposite flanks of the aerofoil 21 will be referenced 65 and 66. The flanks 65, known as the front flank, conventially face in the direction of rotation 46. The opposite flank 66, know as the rear flank, thus faces in the opposite direction. The path of blade 21 and of its flank 65, 66 passing through the passive chamber 30c will be described. The references of the blade 21 and of its flank 65, 66 are given successive indices a, b, c, corresponding respectively to the entering position, central position and the exiting position. Under the effect of the wheel 19 rotating in the direction of rotation 46, the blade 21 a arriving from the passive chamber 30b enters the active chamber 30c by passing through the cutout 62 of a transverse partition 61 with a limited clearance E2 with respect to the shaped edge 35 delimiting said cutout 62. The front flank 65a of said aerofoil 21 a thus faces the vibrating surface 40 at the upper end of the sonotrode 41. The front flank 65a is thus exposed to the mist of microbeads and therefore experiences peening. The rear flank 66a on the other hand is only slightly exposed to the mist of microbeads and this will increase gradually as the blade 21 a approaches the central position. In its central position, the blade now referenced 21b is completely immersed in the mist of microbeads. Thus, its two flanks, here referenced 65b, 66b, are exposed to practically the same level of peening. As it begins to emerge, the blade, now referenced 21cexposes its rear flank 65c to the mist of microbeads thus its front flank 65c is only slightly exposed and so just the rear flank 65c is peened. It will be understood that the symmetry of the active chamber 30c and of the vibrating surface 40 with respect to a vertical geometric plane P containing the geometric axis of rotation 16 means that the mist of microbeads inside the active chamber 30c is symmetric with respect to this same plane P. As a result, the opposite flanks 65, 66 of the blade 21 will, in the active chamber 30c, follow symmetric paths through such a mist of microbeads incurring equivalent peening on each pass. Any difference in peening that occurs between the opposite chamber 30c is temporary because it is substantially equalised at the instant that the blade 21 leaves the active chamber 30c. It will also be understood that peening performed in N revolutions instead of just one has the effect of dividing this temporary difference in peening between flanks 65, 66 by N. For example, if the peening is performed in N=20 revolutions, this temporary distance is then merely equal to 5% of the total peening. However, it is considered that N=5 revolutions is a minimum acceptable for peening the very thin blades 21 used in turbine engines. It is possible to give far larger numbers of revolutions provided the tangential speed of the blades 21 resulting from this remains negligible by comparison with the mean incident speed to the blade 21 of the microbeads which forms the peening mist. If this condition is not respected asymmetry is created, the front flank 65 then experiencing peening at a greater intensity than the peening experienced by the rear flank 66. In this example, the width L1 of the chamber is equal to four times the distance L2 between two consecutive blades 21, this chamber therefore being able to contain up to five blades simultaneously.

A fraction 70 of the microbeads present in the chamber passes through the inter-blade spaces 24 into the adjacent passive chambers 30b and 30d. These microbeads rapidly loose their energy and drop to the bottom 31 to constitute a stream 71 dropping under gravity along the thalwegs 50. Thus, these microbeads return to the active chamber 30c by passing through the transverse partition 61 via spaces or tunnels 51 left between said transverse partitions 61 and said bottom 31.

The tips 80 of the blades 21 experience "hammering" under the effect of the peening. This "hammering" widens them a little into a hammerhead shape. The blades 21 will therefore be given a height greater than the definitive height. Thus, these tips 80 will be machined off after peening for example by finish grinding, so as to return the blades 21 to their definitive height and remove the hammerheads.

Advantageously, forms referenced 83 in FIG. 1 will be placed in the active chamber 30c. These forms 83 arc located on each side of the blades 21. These blades 21 pass through the active chamber 30c between said forms 83 with this same clearance E2. An arrangement such as this has the effect of preventing the microbeads for impacting the leading edges 81 and trailing edges 82 of said blades. The leading and trailing edges are naturally very thin, and therefor the form 83 protects these leading edges 81 and trailing edges 82 from hammering as described above.

What is claimed is:

1. A method for ultrasonic peening of parts on a wheel comprising an annular surface centered on the geometric axis of rotation of the wheel, the method including the steps of:

a) providing the parts on said annular surface of the wheel aligned on a geometric circle centered on the geometric axis of rotation so that the parts of the wheel define a geometric surface of revolution, b) providing at least three chambers with respective openings having lateral edges, c) providing said wheel simultaneously above the openings of said at least three chambers so that at least some of the said parts extend into said chambers through said openings and said lateral edges are arranged on each side of said parts on said wheel, d) providing said lateral edges with a limited clearance E1 from said annular surface e) providing said openings with two shaped edges facing one another so that said shaped edges face the geometric surface of rotation with limited clearance E2, f) providing each chamber adjacent its neighbouring chamber with a shaped edge between these chambers, g) providing at least one chamber with a vibration surface so that said chamber is an active chamber whilst at least two other chambers are passive chambers, h) providing each active chamber between two other chambers either side, i) providing at least one active chamber with a plurality of microbeads whereby said vibration surface energises said plurality of microbeads to form a mist of microbeads in the said active chamber, j) rotating said wheel about its geometric axis of rotation in order that said parts on said wheel pass successively through said chambers whereby said mist of microbeads provides peening of said parts on said wheel, k) supplying microbeads to said at least one active chamber and recovering any of said microbeads which are carried into and fall in any of said passive chambers.

2. A method according to claim 1, wherein the clearance E1 provided between the lateral edges and the annular surface is set to be less than the diameter of the microbeads used.

3. A method according to claim 1 wherein the clearance E2 provided is set to be at most equal to twice the diameter of the microbeads used.

4. A method according to claim 1, wherein the circumferential length of the chambers are set to be at least equal to three times the circumferential distance between two consecutive parts prior to peening.

5. A method according to claim 1, wherein the wheel performs at least five rotations during peening of the said parts.

6. A method according to claim 1, wherein the active chambers and the vibrating surfaces are set to be symmetric with respect to a vertical geometric plane P containing the geometric axis of rotation prior to peening.

7. A method according to claim 1, wherein prior to use said chambers are arranged in succession, comprising two passive chambers followed by an active chamber, and then two more passive chambers as presented to the said part of the said wheel.

8. A peening machine including a spindle for holding and rotating a wheel about a geometric axis of rotation, the peening machine comprising a plurality of chambers including at least one active chamber having a vibrating surface for sustaining a mist of microbeads in said active chamber, the chambers each comprising an opening facing toward the geometric axis of rotation, each opening being delimited by two lateral edges facing each other, one of the lateral edges of each opening being positioned on a first arc of a geometric circle centered on the geometric axis of rotation, while the other lateral edge of each opening is positioned on a second arc of a geometric circle, centered on the geometric axis or rotation, each opening also comprising two shaped edges which are identical and arranged on a geometric circle centered on the geometric axis of rotation, the said chambers each being adjacent to the next chamber with a shaped edge therebetween, each active chamber being located between two other chambers and means for supplying each said active chamber with microbeads and means for removing the microbeads from chambers other than each active chamber.

9. Peening machine according to claim 8, wherein the chambers comprise lateral walls and the means for supplying the active chambers with microbeads and the means for removing the microbeads from the chambers other than each active chamber consist of thalwegs at the bottom of each said chamber other than the active chamber, said thalwegs removing the microbeads under gravity from the chambers other than each active chamber and terminating in at least one active chamber, said thalwegs passing through tunnels in the lateral walls of the chambers.

10. Peening machine according to claim 8 wherein the chambers are removeable from the machine.

11. Peening machine according to claim 8, wherein the machine comprises a tank which is open at the top and has two circular arc-shaped edge faces centered on the geometric axis of rotation, said tank comprising two flat and mutually parallel longitudinal walls, each longitudinal wall supporting one of the circular arc-shaped edge faces, said longitudinal walls being connected by transverse walls closing the tank laterally, transverse partitions dividing said tank into the plurality of chambers, each said chamber being open between the two circular arc-shaped edge faces.

* * * * *

UNITED STATES PATENT AND TRADEMARK OFFICE
CERTIFICATE OF CORRECTION

PATENT NO. : 6,336,844
DATED : January 8, 2002
INVENTOR(S) : Duquenne et al.

It is certified that error appears in the above-identified patent and that said Letters Patent is hereby corrected as shown below:

Column 1,
Line 58, please change "Hank" to -- flank --.

Column 2,
Line 10, please change "tinter" to -- inter --.

Column 3,
Line 8, please change "aerobils" to -- aerofoils --.

Column 5,
Line 42, please change "acrofoil" to -- aerofoil --; and
Line 54, please change "acrofoils" to -- aerofoils --.

Column 9,
Line 26, change "21cexposes" to -- 21c exposes --.

Signed and Sealed this

Twenty-first Day of May, 2002

Attest:

Attesting Officer

JAMES E. ROGAN
Director of the United States Patent and Trademark Office